US006934790B2

(12) United States Patent
Saida

(10) Patent No.: US 6,934,790 B2
(45) Date of Patent: Aug. 23, 2005

(54) DATA TRANSMITTING AND RECEIVING SYSTEM WITH SPEEDY RETRANSMISSION OF MISSING DATA AND DATA RECEIVING DEVICE

(75) Inventor: Yukihiro Saida, Tokyo (JP)

(73) Assignee: Oki Data Corporation, Tokyo (JP)

( * ) Notice: Subject to any disclaimer, the term of this patent is extended or adjusted under 35 U.S.C. 154(b) by 260 days.

(21) Appl. No.: 10/075,292

(22) Filed: Feb. 15, 2002

(65) Prior Publication Data

US 2002/0116566 A1 Aug. 22, 2002

(30) Foreign Application Priority Data

Feb. 22, 2001 (JP) ........................................ 2001-045901

(51) Int. Cl.[7] ................................................ G06F 13/14

(52) U.S. Cl. ........................ 710/313; 710/314; 710/310; 710/33; 710/34; 710/30; 710/29

(58) Field of Search ................................ 710/309–314, 710/305–306, 6, 15–16, 20–21, 29–36, 60–61, 307

(56) References Cited

U.S. PATENT DOCUMENTS 5,832,492 A * 11/1998 Wooten ...................... 707/101
5,933,611 A * 8/1999 Shakkarwar ................ 710/100
5,996,031 A * 11/1999 Lim et al. ...................... 710/52
6,067,591 A * 5/2000 Howard et al. ............. 710/100
6,119,190 A * 9/2000 Garney ....................... 710/310
6,434,643 B1 * 8/2002 Ejiri ............................ 710/58
6,742,076 B2 * 5/2004 Wang et al. ................ 710/314

FOREIGN PATENT DOCUMENTS

EP 1102171 A2 * 5/2001 .......... G06F/13/38
JP 10-228355 8/1998

* cited by examiner

*Primary Examiner*—Paul R. Myers
*Assistant Examiner*—Raymond N Phan

(57) ABSTRACT

A system for transmitting and receiving data between a data transmitting device such as a computer and a data receiving device such as a peripheral device is capable of shortening the time required to complete transmission and receipt of all of the data, including re-transmission of missed data. The data transmitting device is provided with a first transmitting section to periodically and sequentially send a plurality of split data obtained by splitting data to be transmitted to the peripheral device, and with a second transmitting section. The second transmitting section sends split data, when the data receiving device was unable to receive split data fed from the first transmitting section, to the data receiving device during a period of time between time bands in which the first transmitting section transmits the split data.

32 Claims, 5 Drawing Sheets

DATA TRANSMITTING AND RECEIVING SYSTEM WITH SPEEDY RETRANSMISSION OF MISSING DATA AND DATA RECEIVING DEVICE

BACKGROUND OF THE INVENTION

1. Field of the Invention

The present invention relates to a data transmitting and receiving system adapted to transmit and receive data and a data receiving device, more particularly to the data transmitting and receiving system and a data receiving device which are required to re-transmit data that a receiver was unable to receive, that is, to re-transmit missed data.

2. Description of the Related Art

One of the data transmitting and receiving systems that are required to re-transmit missed data is a printing system. In the printing system, data to be printed is transmitted or received between a computer and its peripheral devices in accordance with Universal Serial Bus (USB) standards which designates input and output interface operations between the computer and peripheral devices. For example, in Japanese Patent Application Laid-open No. Hei 10-228355, a printing system is disclosed which operates in accordance with isochronous transfer specifications and interrupt transfer specifications designated in the USB standards.

In the conventional printing system, the computer transmits printing data periodically and sequentially to the printer in accordance with the isochronous transfer specifications. The USB standards indicate that isochronous transfer specifications can not ensure a sure and reliable transmission or a sure and reliable receipt of data. In the above conventional printing system, in order to ensure a sure and reliable transmission or receipt of data, the computer, every time it transmits printing data, makes an inquiry of the printer as to whether or not the printer could receive the printing data in accordance with the interrupt transfer specifications, that is, about presence or absence of missing of printing data, and then the printer notifies, in response to the inquiry, the computer of the presence or absence of the missed data in accordance with the interrupt transfer specifications.

The computer described above, when being notified, by the printer, of missing of printing data, re-transmits the missed printing data, instead of data that was to be transmitted next, with timing when printing data is to be transmitted subsequent to the missed printing data. The computer, when being notified, by the printer, of the receipt of the re-transmitted printing data, transmits printing data that had to be transmitted next, that is, the printing data to be transmitted subsequent to the printing data that was re-transmitted. Thus, since the computer performs the re-transmitting operation whenever the data is missed, sure and reliable transmission and receipt of all the printing data between the computer and printer is ensured.

However, the conventional printing system has problems. As described above, in the conventional printing system, since, when printing data is missed, the computer, with timing when printing data is to be transmitted subsequent to the missed printing data, re-transmits the missed printing data, instead of the printing data that had to be transmitted next, time required to complete the transmission and receipt of all printing data between the computer and the printer is made long, that is, comparatively long time is needed to complete the above transmission and receipt of data.

SUMMARY OF THE INVENTION

In view of the above, it is an object of the present invention to provide a data transmitting and receiving system required to re-transmit missed data being capable of shortening time required to complete transmission and receipt of all data to be transmitted in data transmission containing re-transmission of the missed data.

According to a first aspect of the present invention, there is provided a data transmitting and receiving system including:

a data transmitting device;

a data receiving device being connected to the data transmitting device; and wherein data is transmitted and received between the data transmitting device and the data receiving device and wherein the data transmitting device is provided with a first transmitting section used to periodically and sequentially transmit a plurality of split data obtained by splitting data to be transmitted, to the data receiving device and with a second transmitting section used to transmit the split data, when the data receiving device was unable to receive the split data sent from the first transmitting section, to the data receiving device, during a period of time between transmitting time bands in which the first transmitting section transmits the split data.

In the foregoing, a preferable mode is one wherein the first transmitting section transfers the split data in accordance with isochronous transfer specifications designated by the USB standards and the second transmitting section transmits the split data that the data receiving device was unable to receive, in accordance with bulk transfer specifications designated by the USB standards.

Also, a preferable mode is one wherein the first transmitting section, after having transmitted the split data to the data receiving device in accordance with interrupt transfer specifications designated by the USB standards, prior to the first transmitting section's transmission of split data existing subsequent to the split data, makes an inquiry of the data receiving device as to whether the data receiving device was able to receive the split data transmitted by the first transmitting section.

Also, a preferable mode is one wherein the data receiving device, in response to the inquiry from the first transmitting section as to whether the data receiving device was able to receive the split data transmitted by the first transmitting section in the data transmitting device in accordance with interrupt transfer specifications, notifies the first transmitting section as to whether the data receiving device was able to receive the split data, in accordance with the interrupt transfer specifications.

Also, a preferable mode is one wherein the data receiving device stores information about location of split data to be stored that the data receiving device was unable to receive.

Also, a preferable mode is one wherein the second transmitting section, when the first transmitting section has received a notification that the data receiving device was unable to receive the split data, transmits, in accordance with the bulk transfer specifications, the split data that the data receiving device was unable to receive, to the data receiving device.

Also, a preferable mode is one wherein the second transmitting section transmits the split data that the data receiving device was unable to receive, in the order in which the first transmitting section transmitted the split data.

Also, a preferable mode is one wherein the second transmitting section, when the data receiving device was unable to receive split data transmitted by the second transmitting section in accordance with the bulk transfer specifications, re-transmits the split data that the data receiving device was unable to receive, in accordance with the bulk transfer specifications.

Also, a preferable mode is one wherein the data receiving device stores information about location of missed split data the data receiving device was unable to receive.

Also, a preferable mode is one wherein the data receiving device is a printing system and wherein the first transmitting section and second transmitting section transmit split data produced by splitting printing data to be printed by the printing system in a form of the split data.

According to a second aspect of the present invention, there is provided a data transmitting and receiving system including a unit used to sequentially and periodically transmit a plurality of split data obtained by splitting data to be sent and to non-periodically transmit split data out of the split data that was not received normally.

In the foregoing, a preferable mode is one that wherein includes a data transmitting device and a data receiving device being connected to the data transmitting device, wherein the data transmitting device is provided with a transmitting portion used to transmit data to the data receiving device and a receiving portion used to receive data from the data receiving device and wherein the transmitting portion has a first transmitting section to periodically transmit the split data and a second transmitting section to non-periodically transmit split data out of the split data fed from the first transmitting section that the data receiving device was unable to receive normally.

Also, a preferable mode is one wherein the second transmitting section performs the transmission of data to the data receiving device during a period of time between transmitting time bands in which the first transmitting section transmits the data.

According to a third aspect of the present invention, there is provided a data transmitting and receiving system comprising a unit used to sequentially and periodically receive a plurality of split data obtained by splitting data to be received and to non-periodically receive split data out of the split data that was not received normally.

In the foregoing, a preferable mode is one that wherein includes a data transmitting device and a data receiving device being connected to the data transmitting device, wherein the data receiving device is provided with a transmitting portion used to transmit data to the data transmitting device and a receiving portion used to receive data from the data transmitting device and wherein the receiving portion has a first receiving section to periodically receive the split data and a second receiving section to non-periodically receive split data, out of the split data fed from the data transmitting device, which the first receiving section was unable to receive normally.

Also, a preferable mode is one wherein the second receiving section performs the receiving of data from the data transmitting device during a period of time between receiving time bands in which the first receiving section receives the data.

With the above configurations, when the data receiving device was unable to receive split data transmitted by the first transmitting section, a second transmitting section sends out the split data that the periodical device was unable to receive during a time band in which said first transmitting section transmits the split data and therefore it is possible to shorten time required to complete transmission of the split data that was not received in data transmission including the re-transmission of missed data, that is, it is possible to inhibit extension of time required before all the transmission and receipt of data to be transmitted and received between the data transmitting device and the data receiving device.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with reference to the accompanying drawings.

Embodiment

Figure 1:
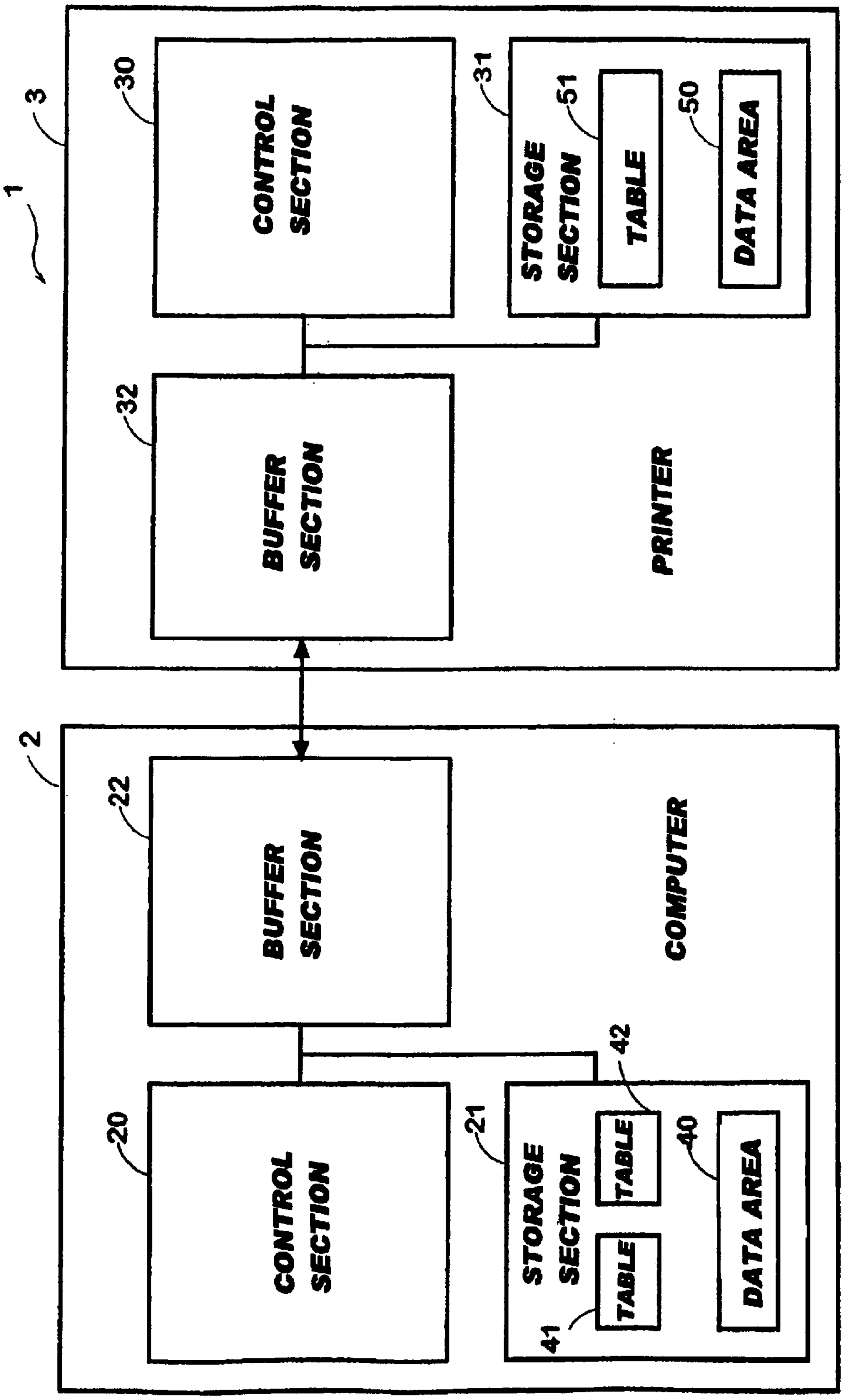
FIG. 1 is a schematic block diagram showing configurations of a printing system according to an embodiment of the present invention.

FIG. 1 is a schematic block diagram showing configurations of a printing system according to an embodiment of the present invention. The printing system of the embodiment, as shown in FIG. 1, includes a computer 2, being a data transmitting device, used to send out printing data being data to be printed such as document data and image data to a printer 3 being a data receiving device in accordance with the USB standards designating data transfer between a computer and a peripheral device such as a printer and the printer 3 being connected to the computer 2 used to receive the printing data from the computer 2 in accordance with the USB standards.

The USB standards, in accordance with which the printing data is sent out or is received, designate 4 kinds of data transfer specifications. More particularly, it includes a control transfer specification to transfer a control signal, an isochronous transfer specification to transfer a predetermined amount of data within a predetermined time without ensuring a normal receipt of data, a bulk transfer specification to transfer a predetermined amount of data with the normal receipt of data ensured, irrespective of length of time required for the transfer and an interrupt specification to transfer an amount of data being smaller than those to be transferred according to both the isochronous transfer specification and the bulk transfer specification. In the embodiment, since the amount of printing data is large, the computer 2 and printer 3 send and receive the printing data in accordance with the isochronous transfer specification or the bulk transfer specification.

According to the USB standard, since the computer assigns a transmission speed, that is, a data band to be used in accordance with the isochronous transfer specification and the bulk transfer specification and, moreover, higher priority is given to the isochronous transfer in which a large amount of data has to be sent and received within predetermined time rather than to the bulk transfer in which a large amount of data is sent, the computer 2 assigns higher priority to acquisition of data band for the isochronous transfer specification rather than to the acquisition of data band for the bulk transfer specification. Therefore, the isochronous transfer specification is originally more suitable for periodically and sequentially transmitting and receiving data described above than the bulk transfer specifications.

Moreover, according to the USB standard, in one time transfer operation, a maximum data band (1023 bytes) to be assigned for the isochronous transfer is larger than the maximum data band (64 bytes) assigned for the bulk transfer. Therefore, as described above, when the computer 2 of the embodiment transfers split data sent in accordance with the isochronous transfer specification, further in accordance with the bulk specification, it is necessary, generally, to send the split data with the data being split into two, three, or a like, that is, with the data sent two or more times.

As shown in FIG. 1, the computer 2 includes a sending data area 40 used to store printing data to be sent to the printer 3, a signal transmitting management table 41 used to manage transmitting and re-transmitting of the printing data, a storing section 21 having a re-transmitting management table 42, a buffer section 22 used to send out the printing data to the printer 3 in accordance with the isochronous transfer specification or with the bulk transfer specification and a control section 20 used to control operations of the storing section 21 and buffer section 22.

Figure 2:
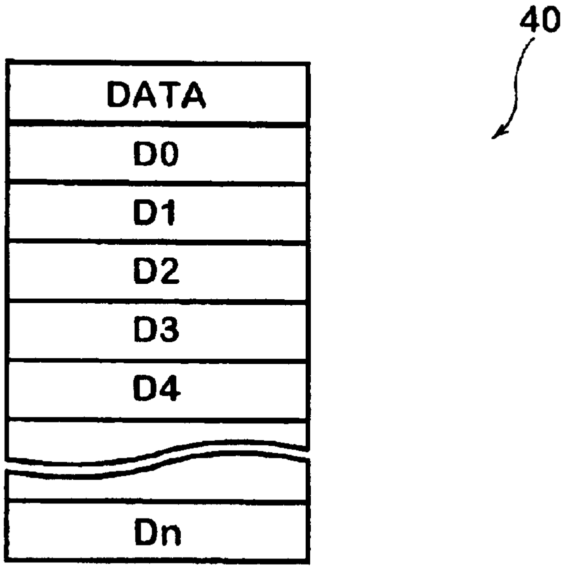
FIG. 2 shows a transmitting data area in a storing section according to the embodiment of the present invention.

FIG. 2 shows a transmitting data area in a storing section according to the embodiment of the present invention. The sending data area 40 pre-stores printing data such as document data, image data or a like created by using said computer 2 and, as shown in FIG. 2, the printing data is made up of a plurality of split data D0 to Dn ("n" is an arbitrary positive integer) obtained by splitting the printing data. Each of the split data D0 to Dn is equivalent to one frame having a variable length being a unit for data transfer between the computer 2 and the, printer 3. Therefore, a length of each of the split data D0 to Dn is not always the same.

Figure 3A:
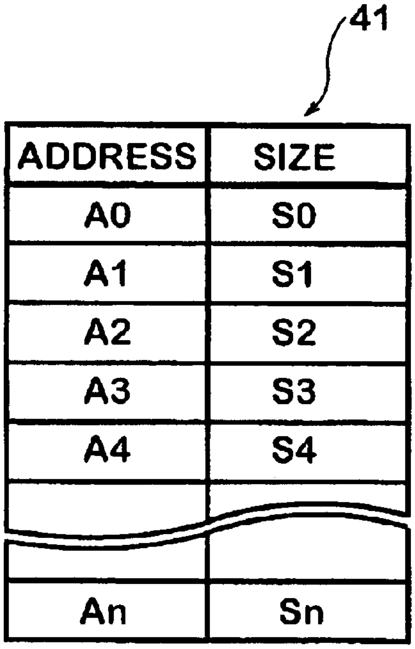
FIG. 3(*a*) shows a signal transmitting management table 41 in the storing section of the computer and FIG. 3(*b*) shows a re-transmitting management table in the storing section of the computer according to the embodiment of the present invention.
Figure 3B:
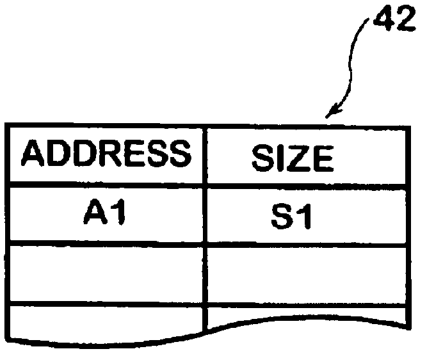

FIG. 3(*a*) shows the signal transmitting management table 41 in the storing section 21 of the computer 2 and FIG. 3(*b*) shows the re-transmitting management table 42 also in the storing section 21 of the computer 2. The signal transmitting management table 41 pre-stores a head address and a size of each of the split data D0 to Dn shown in FIG. 2 in the sending data area section 40. In FIG. 3(*a*), the address A0 represents a starting address of the split data D0 shown in FIG. 2 in the sending data area section 40 and the size "S0" represents a size of the split data D0 in the sending data area 40, that is, a terminating address of the split data D0 in the sending data area 40 is (A0+S0). Similarly, the address "An" represents a starting address of the split data Dn shown in FIG. 2 in the sending data area 40 and the size "Sn" represents a size of the split data Dn in the sending data area 40, that is, a terminating address of the split data Dn in the sending data area section 40 is (An+Sn).

On the other hand, in the re-transmitting management table 42 are stored, by the control section 20, an address and its size used to identify, when the printer 3 notifies the computer 2 that the printer 3 could not receive split data transmitted by the computer 2 to the printer 3, that is, when the printer 3 notifies the computer 2 that missing of data has occurred, the missed and split data, and the order in which the address and size are stored matches the order of the split data D0 to Dn in the signal transmitting management table 41.

In FIG. 3(*b*), for example, "A1" is stored as an address and "S1" is stored as a size, which means that split data D1 specified by the address A1 and size S1 has been missed and the split data has to be re-transmitted. Moreover, when split data "D3" is missed after the missing of the split data D1, the control section 20 writes an address "A3" and a size "S3" used to identify the split data D3 subsequent to the address A1 and size S1 used to identify the split data D1. This enables the control section 20 to first re-transmit the split data D1 and then the split data D3 when the split data D1 and D3 are re-transmitted.

Referring to FIG. 1, the split data to be transmitted to the printer 3 is written by the control section 20 which operates by referring to the signal transmitting management table 41 in the buffer section 22 serving as a first transmitting section or a second transmitting section. The buffer section 22, when serving as the first transmitting section, the written split data periodically and sequentially, under control of the control section 20, to the printer 3, in accordance with isochronous transfer specifications.

Moreover, the split data to be re-transmitted to the printer 3 is written by the control section 20 operating by referring to the re-transmitting management table 42, in the buffer section 22. The buffer section 22, when serving as the second transmitting section, transmits the written split data, under the control of the control section 20, during a time band while one split data is transmitted in accordance with the isochronous transfer specification and during a time band while split data subsequent to the above one split data is transmitted non-periodically in accordance with the bulk transfer specification, to the printer 3.

Also, the buffer section 22, under control of the control section 20, in accordance with the control transfer specification described above, carries out communications to check a function and capability of the printer 3 and, in accordance with the interrupt transfer specifications, has the printer 3 check whether or not the printer 3 can receive the split data transmitted in accordance with the isochronous transfer specification.

The control section 20, as described above, when receiving a notification of missing of data from the printer 3, writes information about the missed data in the re-transmitting management table 42. Moreover, the control section 20, as described later, when having received an OK signal notifying of normal receipt of the data from the printer 3, checks whether or not there exists information about data to be sent to the re-transmitting management table 42.

If there is no information about data to be transmitted to the re-transmitting management table 42, the control section 20, in order to transmit subsequent split data by referring to the signal transmitting management table 41 to the printer 3 in accordance with the isochronous transfer specifications, writes the split data in the buffer section 22.

On the other hand, if there is information about data to be transmitted to the re-transmitting management table 42, the control section 20, in order to transfer the data to the printer in accordance with the bulk transfer specification, writes the data in the buffer section 22.

The printer 3 includes a storage section 31 made up of a receiving data area section 50 used to store, when receiving printing data transmitted by the computer 2, the received printing data and of a missing management table 51 used to manage an event of no receipt of the printing data, that is, to manage an event of missing of printing data, a buffer section 32 used to receive the printing data from the computer 2 in accordance with the USB specification, and a control section 30 used to control operations of the storage section 31 and the buffer section 32.

Figure 4:
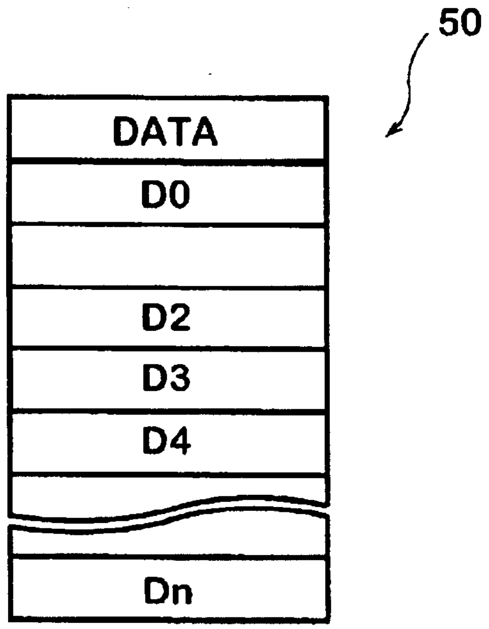
FIG. 4 is a diagram a received data area in a storage section of a printer according to the embodiment of the present invention.

FIG. 4 is a diagram a received data area in a storage section of a printer according to the embodiment of the present invention. The receiving data area 50 corresponds to the transmitting data area 40 in the storage section 21 of the computer described in FIG. 2. More particularly, the receiving data area 50 is used to store printing data saved in the sending data area 40 to be transmitted in accordance with the isochronous transfer specification or bulk transfer specification, sequentially in the order in which the buffer has received.

Figure 5:
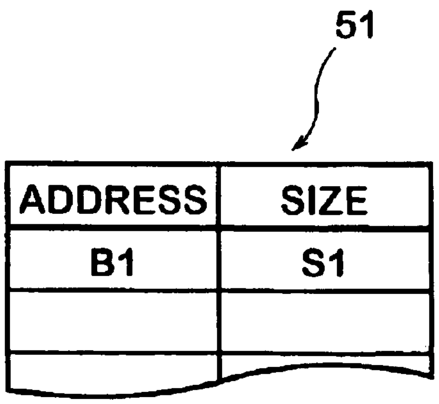
FIG. 5 is a diagram showing a missed data management table in the storage section of the printer according to the embodiment of the present invention.

FIG. 5 is a diagram showing a missed data management table 51 in the storage section of the printer of the embodiment. The missed data management table 51 is used when the buffer section 32 is unable to receive split data transmitted from the computer 2, that is, the split data is missed and, therefore, sizes of the head address and the split data in the receiving data area section 50 to store the split data have to be written by the control section 30. FIG. 5 shows that the missed split data has to be stored, for example, in a range between the head address B1 and the size S1 in the receiving data area section 50, that is, in the range between the head address B1 and an address designated by end address (B1+S1).

Moreover, the control section 30, since it is provided with a counter (not shown) adapted to count the number of the split data received from the computer 2, can recognize which split data out of the split data D0 to Dn has been missed. The control section 30, even if the split data is missed, can identify a size of the missed split data by using an address "An" and size "Sn" of the split data existing before and after the missed split data. This enables the sizes of the head address and of split data in the receiving data area section 50 to be stored in the missed data management table 51 in which the missed split data is to be stored.

The buffer section 32 has a function corresponding to the buffer section 22 in the computer 2 and, more specifically, performs functions of sending and receiving data to and from the computer 2 in accordance with the isochronous transfer specifications, bulk transfer specifications, control transfer specifications and interrupt transfer specifications.

Figure 6:
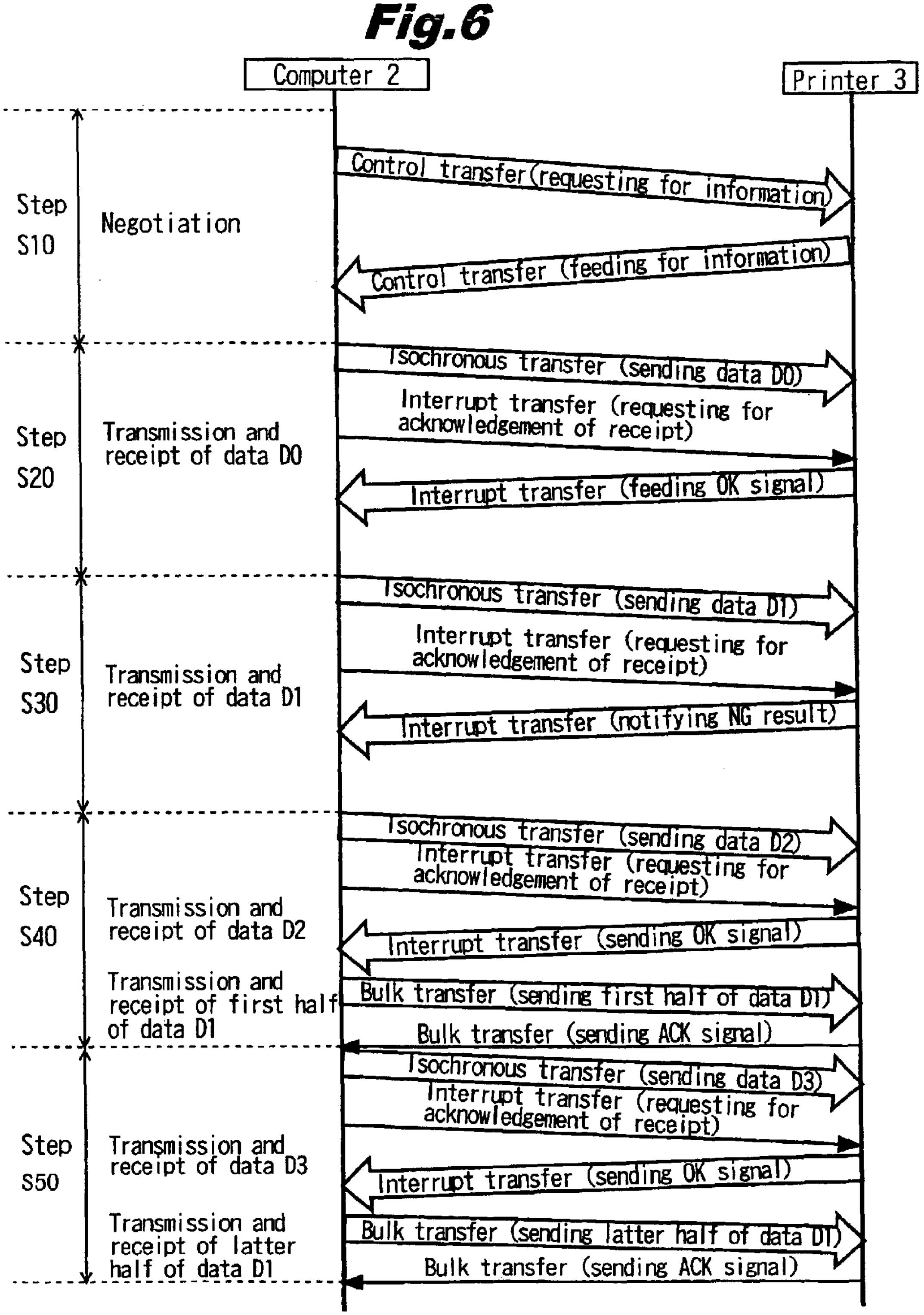
FIG. 6 is a diagram showing operations of the printing system of the embodiment.
Figure 7:
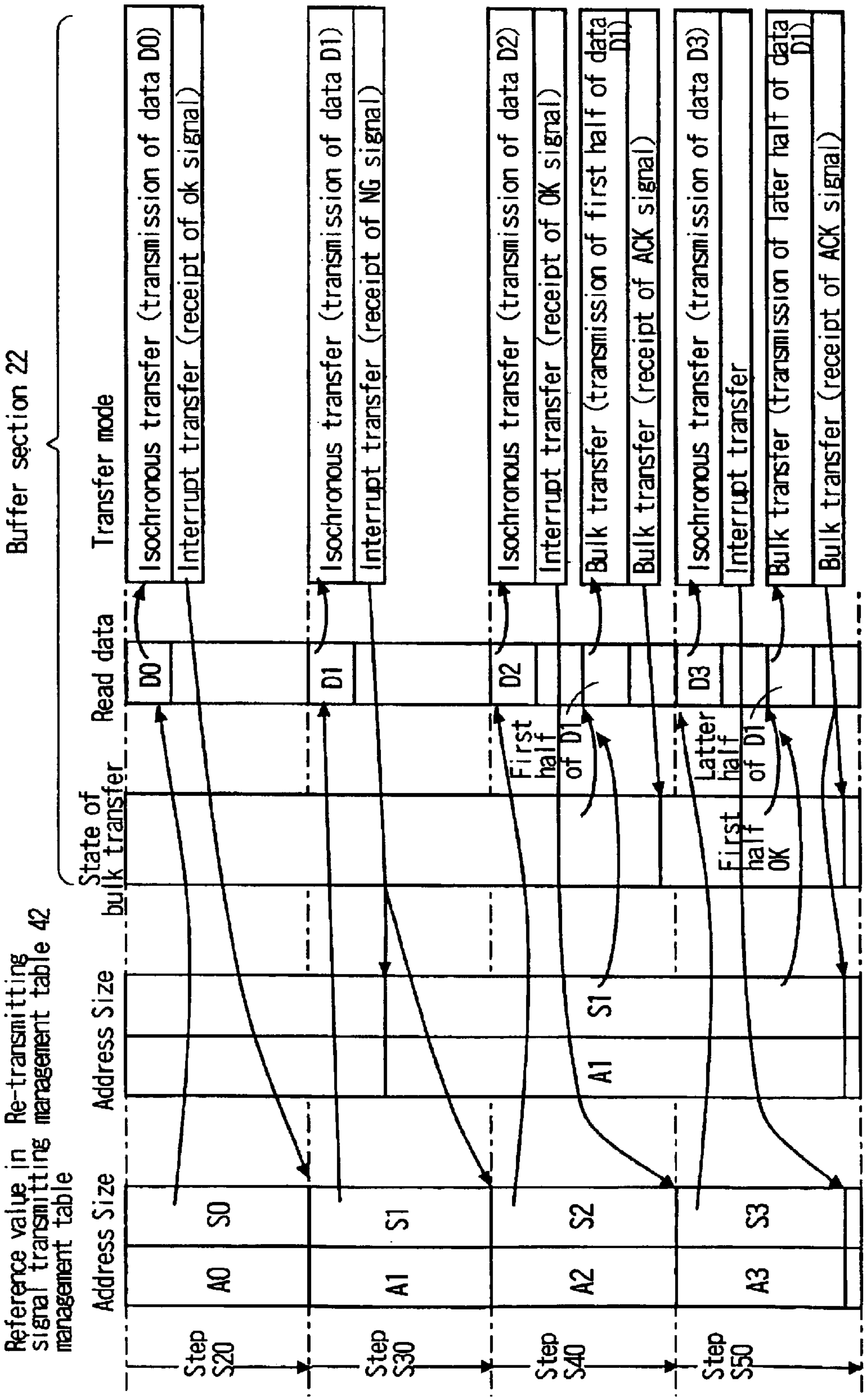
FIG. 7 is also a diagram showing operations of the printing system of the embodiment.

FIGS. 6 and 7 are diagrams showing operations of the printing system of the embodiment of the present invention. Descriptions are provided by referring to FIGS. 6 and 7. To simplify descriptions and to facilitate understanding, let it be assumed that the split data D0, D2, and D3 are normally transmitted and received while the split data D1 is missed and the missed split data is transmitted on two occasions.

Step S10: Prior to the transmission and receipt of the printing data, the control section 20 of the computer 2 makes a request of the printer 3 to transmit the information about the function and capability of the printer 3 in accordance with the control transfer specifications in the buffer section 22. The control section 30 of the printer 3, in response to the above request, feed the information about the function and capability of the printer 3 to the computer 2 in accordance with the control transfer specifications in the buffer section 32. The control section 20 of the computer 2, when having received the information about the function and capability of the printer 3, assigns, for example, data band for the isochronous transfer operation and data band for bulk transfer operation, as described above. Thus, prior to the transmission and receipt of printing data, negotiation between the computer 2 and printer 3 is completed.

Step S20: When the negotiation has been completed at Step S10, the control section 20 of the computer 2 reads the split data D0 being the first data of the printing data fed from the sending data area 40 according to the first address A0 and the size S0 in the signal transmitting management table 41 in the storing section 21 and writes the split data D0 into the buffer section 22. The buffer section 22, when the split data D0 designated by the signal transmitting management table 41 is written therein, sends out the split data D0 to the printer 3 in accordance with the isochronous transfer specifications. The control section 20 of the computer 2, when the split data D0 is sent out from the buffer section 22, makes an inquiry of the printer 3 as to whether the printer 3 was able to receive the split data D0, that is, about presence or absence of missing of printing data, in accordance with the interrupt transfer specifications in the buffer section 22. The control section 30 of the printer 3, since it has received the split data D0 normally, in response to the inquiry from the computer 2, feeds an OK signal indicating the normal receipt of the signal to the computer 2 in accordance with the interrupt transfer specifications of the buffer section 32.

Step S30: The control section 20 of the computer 2, when the transmission and receipt of the split data D0 has completed at Step S20, reads the split data D1 existing subsequent to the split data D0, which is designated by the address A1 and size S1 each existing subsequent to the address A0 and size S0 in the signal transmitting management table 41 in the storing section 21, from the sending data area 40 and writes the read split data D1 to the buffer section 22. The buffer section 22, when the split data D1 designated by the signal transmitting management table 41 is written, as in the case of the split data D0 described above, sends out the split data D1 in accordance with the isochronous transfer specifications to the printer 3. The control section 20 of the computer 2, when having transmitted the split data D1 to the printer 3, as in the case of processing the split data D0, makes an inquiry of the printer 3 as to whether the printer 3 was able to receive the split data D1 normally in accordance with the interrupt transfer specifications in the buffer section 22. The control section 30 of the printer 3, since the split data D1 has not been received normally, in response to an inquiry from the computer 2, returns an NG signal indicating no normal receipt of the signal to the computer 2 in accordance with the interrupt transfer specifications.

Step S40: The control section 20 of the computer 2, when having been notified by the printer that there was a failure in the transmission or receipt of the split data D1 at Step 30, that is, that the split data was missed, writes the address A1 and size S1 used to identify the missed split data D1 to the re-transmitting management table 42. The control section 20, when having completed the writing of the address A1 and size S1 on the re-transmitting management table 42, as in the case of transmission of the split data D0 and D1, reads the split data D2 to be identified by an address A2 and size S1 existing subsequent to the address A1 and size S1 on the signal management table 41, from the sending data area 40 and writes the read split data D2 to the buffer section 22. The buffer section 22, when the split data D2 designated by the signal transmitting management table 41 has been written therein, sends out the split data D2 to the printer 3 in accordance with the isochronous transfer specifications.

The control section 20, after having sent the split data D2 to the printer 3, makes an inquiry of the printer 3 as to whether the printer 3 was able to receive the split data D2 normally in accordance with the interrupt transfer specifications in the buffer section 22. The control section 30 of the printer 3, since it has received the split data D2 normally, in response to the inquiry from the computer 2, feeds an OK signal indicating the normal receipt of the signal to the computer 2, in accordance with the interrupt transfer specifications of the buffer section 32.

The control section 20 of the computer 2, when the transmission of the split data D2 has completed in accordance with the isochronous transfer specifications, confirms, by referring to the re-transmitting management table 42, the head address A1 and size S1 of the split data D1 existing in a range of storage area in which the split data D1 that was missed at Step S30 is stored and then reads a first half of the split data D1 from the sending data area 40 and writes the read first half of the split data D1 in the buffer section 22. The buffer section 22, when the first half of the split data D1 has been written therein, sends out the first half of the split data D1 to the printer 3 in accordance with the bulk transfer. The control section 30 of the printer 3, since it has received the first half of the split data D1 normally, transmits an ACK signal indicating the normal receipt of the data by the computer 2, in accordance with the bulk transfer specifications of the buffer section 32.

Step S50: When the transmission of the split data D2 in accordance with the isochronous transfer specifications and of the first half of the missed split data D1 in accordance with the bulk transfer specifications have completed, the control section 20 of the computer 2 reads the split data D3 existing subsequent to the split data D2 designated by an address A3 and size S3 existing subsequent to the address A2 and size S2 of the split data D2 on the signal transmitting management table 41 from the sending data area 40 and writes the split data D3 to the buffer section 22. The buffer section 22, when the split data D3 has been written therein, sends out the split data D3 to the printer 3 in accordance with the isochronous transfer specifications.

The control section 20, after having transmitted the split data D3 to the printer 3, makes an inquiry of the printer 3 as to whether the printer 3 was able to receive the split data D3 normally in accordance with the interrupt transfer specifications. The control section 30 of the printer 3, since it has received the split data D3 normally, in response to the inquiry from the computer 2, feeds out an OK signal indicating the normal receipt of the signal to the computer 2, in accordance with the interrupt transfer specifications.

The control section 20, when having received the OK signal for the receipt of the split data D3 from the printer 3, again refers to the re-transmitting management table 42 and reads a latter half of the split data identified by the address A1 and size S1 contained on the re-transmitting management table 42 from the sending data area 40 and writes the read latter half of the split data D1. The buffer section 22, when the latter half of the split data D1 has been written therein, transmits the latter half of the split data D1 to the printer 3 in accordance with the bulk transfer specifications. The control section 30 of the printer 3, since the latter half of the split data has been received normally, as in the case of Step S40, sends out an ACK signal indicating the normal receipt of the latter half of the split data to the computer 2 in accordance with the bulk transfer specifications. This causes the re-transmission of the missed split data D1 to be completed. Split data other than the split data D4 is transmitted and received between the computer 2 and printer 3, by the same procedures as described above.

Moreover, if there is a band in which the bulk transfer can be performed, prior to the transmission of the split data D3 in accordance with the isochronous transfer specifications, the data can be transmitted in accordance with the bulk transfer specifications.

In the printing system of the embodiment, as described above, when the buffer section 22 of the computer 2 is unable to receive the split data D1 which has been transmitted to the printer 3 in accordance with the isochronous transfer specifications, that is, when the split data D1 has been missed, the buffer section 22 serving as the second transmitting section re-transmits the missed split data, during a time band for the transmission in accordance with the isochronous transfer specifications, that is, while the buffer section 22 serving as the first transmitting section is performing the isochronous transfer of the data, to the printer 3 in accordance with the bulk transfer specifications. It is, therefore, not necessary to send out the missed data D1 during the time band for subsequent isochronous transfer. As a result, in examples shown in FIGS. 6 and 7, even if the split data being transferred in accordance with the isochronous transfer specifications is missed, all the data can be transmitted within the same required time as the time required when no missing of the split data occurs.

In the embodiment described above, the printer 2, when having been able to receive a first half of the split data D1 transmitted in accordance with the bulk transfer specifications, returns the ACK signal indicating the normal receipt to the computer 2. In contrast, the printer 3, when having been unable to receive a first half of the split data D1 normally, preferably sends out the NAK signal indicating the abnormal receipt of the data to the computer 2. The control section 20 of the computer 2, when having received the NAK signal from the printer 3, again sends out the first half of the split data D1 with timing when the latter half of the split data D1 is to be transmitted in accordance with the bulk transfer specifications. This enables the printer 3 to surely receive the first half of the missed split data D1.

Therefore, even if there is a failure in transmitting and receiving the split data in accordance with the bulk transfer specifications, the transmitting and receiving of the missed split data are again performed in accordance with the bulk transfer specifications. As a result, data can be transmitted or received in a shorter time when compared with the conventional transmission and receipt of data performed by the isochronous transfer method in which the bulk transfer method is not used.

As described above, according to the embodiment of the present invention, the first transmitting section mounted in the data transmitting device transmits a plurality of split data obtained by splitting data to be sent to the data receiving device in a periodical and sequential manner. If the data receiving device was unable to receive the split data transmitted by the first transmitting section, the second transmitting section sends the split data that the data receiving device was unable to receive, during a period of time between transmitting time bands in which the first transmitting section transmits the split data and a transmitting time band in which the first transmitting section transmits split data existing adjacent to the split data that the data receiving device was unable to receive and therefore it is possible to shorten time required for the completion of the transmission of the split data that was not received.

It is apparent that the present invention is not limited to the above embodiments but may be changed and modified without departing from the scope and spirit of the invention. For example, in the printing system provided in the above embodiment, when the missed split data D1 is re-transmitted, the control section 20 of the computer 2 does not change the address and size in the re-transmitting management table 42. However, the control section 20, for example, prior to the transmission of the first half of the split data D1, may set a half of the size S1 of the split data D1 as a size used to identify the first half of the split data D1 in the re-transmitting management table 42, which enables the first half of the split data D1 to be easily identified. Moreover, a head address of the latter half of the split data D1 may be set as an address used to identify the latter half of the split data D1 in the re-transmitting management table 42, which enables the latter half of the split data D1 to be easily identified.

Also, the transmitting and receiving system of the above embodiment uses the printer as the data receiving device which is connected to the data transmitting device being the computer in accordance with the USB specifications, however, a printer may be used which is connected to the computer in accordance with the IEEE (Institute of Electrical and Electronic Engineers) 1394. Furthermore, the transmitting and receiving system of the present invention may be applied to various devices having peripheral devices including a modem, storage unit or a like being connected to computers in accordance with the USB specifications.

What is claimed is:

1. A data transmitting and receiving system, comprising:

a data transmitting device; and a data receiving device connected to said data transmitting device to receive a sequence of frames of data sent by said data transmitting device via first transfers during a corresponding sequence of time bands, with one frame of the sequence being transmitted via a first transfer during the corresponding time band, wherein said data transmitting device is provided with a transmitting section which, if said data receiving device was unable to receive a given frame, transmits parts of the given frame again via second transfers during periods of time between the first transfers.

2. The data transmitting and receiving system according to claim 1, wherein said transfers are conducted in accordance with specifications designated by Universal Serial Bus (USB) standards, and said second transfers are conducted in accordance with specifications designated by said USB standards.

3. The data transmitting and receiving system according to claim 1, wherein said data receiving device is a printing system and wherein frames of data are printing data to be printed by said printing system.

4. The data transmitting and receiving system according to claim 1, wherein said time bands are isochronous time bands, said first transfers are isochronous transfers, and said second transfers are bulk transfers.

5. The data transmitting and receiving system according to claim 1, wherein said data transmitting device splits said given frame into a plurality of portions that are transmitted via a plurality of second transfers.

6. The data transmitting and receiving system according to claim 1, wherein said data receiving device is a printer, said data are printing data, and said data transmitting device splits said printing data into said frames.

7. The data transmitting and receiving system according to claim 2, wherein said transmitting section, after having transmitted said given frame to said data receiving device in accordance with interrupt transfer specifications designated by said USB standards, makes an inquiry of said data receiving device as to whether said data receiving device was able to receive said given frame, before transmitting parts of the frame again via said second transfers.

8. The data transmitting and receiving system according to claim 7, wherein said data receiving device, in response to said inquiry from said transmitting section as to whether said data receiving device was able to receive said given frame, notifies said transmitting section as to whether said data receiving device was able to receive said given frame in accordance with interrupt transfer specifications.

9. The data transmitting and receiving system comprising:

a data transmitting device; and a data receiving device connected to said data transmitting device, wherein data is transmitted and received between said data transmitting device and said data receiving device, wherein said data transmitting device is provided with a first transmitting section used to periodically and sequentially transmit a plurality of split data obtained by splitting data to be transmitted, to said data receiving device and with a second transmitting section used to transmit said split data, when said data receiving device was unable to receive said split data sent from said first transmitting section, to said data receiving device, during a period of time between transmitting time bands in which said first transmitting section transmits said split data, wherein said first transmitting section transfers said split data in accordance with isochronous transfer specifications designated by Universal Serial Bus (USB) standards and said second transmitting section transmits said split data that said data receiving device was unable to receive, in accordance with bulk transfer specifications designated by said USB standards, wherein said first transmitting section, after having transmitted said split data to said data receiving device in accordance with interrupt transfer specifications designated by said USB standards, prior to said first transmitting section's transmission of split data existing subsequent to said split data, makes an inquiry of said data receiving device as to whether said data receiving device was able to receive said split data transmitted by said first transmitting section, wherein said data receiving device, in response to said inquiry from said first transmitting section as to whether said data receiving device was able to receive said split data transmitted by said first transmitting section in said data transmitting device in accordance with interrupt transfer specifications, notifies said first transmitting section as to whether said data receiving device was able to receive said split data, in accordance with said interrupt transfer specifications, and wherein said data transmitting device stores information about a location of split data to be stored that said data receiving device was unable to receive.

10. The data transmitting and receiving system according to claim 9, wherein said second transmitting section, when said first transmitting section has received a notification that said data receiving device was unable to receive said split data, transmits, in accordance with said bulk transfer specifications, said split data that said data receiving device was unable to receive, to said data receiving device.

11. A data transmitting and receiving system comprising:

a data transmitting device; and a data receiving device being connected to said data transmitting device, wherein data is transmitted and received between said data transmitting device and said data receiving device, wherein said data transmitting device is provided with a first transmitting section used to periodically and sequentially transmit a plurality of split data obtained by splitting data to be transmitted, to said data receiving device and with a second transmitting section used to transmit said split data, when said data receiving device was unable to receive said split data sent from said first transmitting section, to said data receiving device, during a period of time between transmitting time bands in which said first transmitting section transmits said split data, wherein said first transmitting section transfers said split data in accordance with isochronous transfer specifications designated by Universal Serial Bus (USB) standards and said second transmitting section transmits said split data that said data receiving device was unable to receive, in accordance with bulk transfer specifications designated by said USB standards, and wherein said second transmitting section, when said data receiving device was unable to receive split data transmitted by said second transmitting section in accordance with said bulk transfer specifications, re-transmits said split data that said data receiving device was unable to receive, in accordance with said bulk transfer specifications.

12. A data transmitting and receiving system comprising:

a data transmitting device; and a data receiving device being connected to said data transmitting device;

wherein data is transmitted and received between said data transmitting device and said data receiving device and wherein said data transmitting device is provided with a first transmitting section used to periodically and sequentially transmit a plurality of split data obtained by splitting data to be transmitted, to said data receiving device and with a second transmitting section used to transmit said split data, when said data receiving device was unable to receive said split data sent from said first transmitting section, to said data receiving device, during a period of time between transmitting time bands in which said first transmitting section transmits said split data, wherein said data receiving device stores information about a location of missed split data said data receiving device was unable to receive.

13. The data transmitting and receiving system, comprising:

a data transmitting device and a data receiving device connected to said data transmitting device, wherein said data transmitting device transmits frames of data to said data receiving device periodically via first transfers and non-periodically re-transmits data from frames which said data receiving device was unable to receive normally, the re-transmissions being conducted by second transfers.

14. The data transmitting and receiving system according to claim 13, wherein said re-transmissions are conducted between the first transfers.

15. The data transmitting and receiving system according to claim 13, wherein said first transfers are isochronous transfers and said second transfers are bulk transfers.

16. The data transmitting and receiving system according to claim 13, wherein said frames which said data receiving device was unable to receive normally are split into a plurality of portions by said data transmitting device and transmitted to said data receiving device during a plurality of second transfers.

17. The data transmitting and receiving system according to claim 13, wherein said data receiving device is a printer, said data are printing data, and said data transmitting device splits said printing data into said frames.

18. A data receiving device for use with a data transmitting device that transmits frames of data to said data receiving device periodically via first transfers and re-transmits data from frames which were not received normally via second transfers between said first transfers, said data receiving device comprising:

a receiving section to periodically receive said frames of data via said first transfers and to non-periodically receive data from re-transmitted frames via said second transfers.

19. The data receiving device according to claim 18, wherein said second receiving section performs said receiving of data from re-transmitted frames during periods of time between said first transfers.

20. The data receiving device according to claim 18, wherein said first transfers are isochronous transfers and said second transfers are bulk transfers.

21. A data transmitting and receiving system, comprising:

a data receiving device; and a data transmitting device coupled to the data receiving device, the data transmitting device including a data storing section having a sending data area that stores a sequence of frames of data to be transmitted to the data receiving device, a first table identifying the frames, and a second table identifying frames reported by the data receiving device as not having been properly received, the data transmitting device additionally including a buffer section that periodically transfers the data of frames identified in the first table during first transfers and that non-periodically transfers the data of frames identified in the second table during second transfers, the non-periodic transfers of data occurring between the periodic transfers of data.

22. The system of claim 21, wherein each first transfer sends an entire frame of data to the data receiving device and wherein a frame of data identified in the second table is split, and sent to the data receiving device via a plurality of second transfers.

23. The system of claim 21, wherein the first table identifies the frames to be transmitted via first transfers by head address and frame size, and the second table identifies the frames to be transmitted via second transfers by head address and frame size.

24. The system of claim 21, wherein the first transfers are isochronous transfers conducted in accordance with Universal Serial Bus (USB) standards, and the second transfers are bulk transfers conducted in accordance with the USB standards.

25. The system of claim 21, wherein the data receiving device comprises a storing section having a table with information about the frames reported by the data receiving device as not having been properly received.

26. The system of claim 21, wherein the data receiving device is a printer.

27. The system of claim 24, wherein the buffer section additionally sends an interrupt transfer in accordance with the USB standards after each isochronous transfer, the interrupt transfer requesting acknowledgement of receipt by the data receiving device.

28. A data transmitting device for use with a data receiving device, said data transmitting device comprising:

a data storing section which includes a sending data area that stores a sequence of frames of data to be transmitted to the data receiving device, a first table identifying the frames, and a second table identifying frames reported by the data receiving device as not having been properly received; and a buffer section that periodically transfers the data of frames identified in the first table during first transfers and that non-periodically transfers the data of frames identified in the second table during second transfers, the non-periodic transfers of data occurring between the periodic transfers of data.

29. The data transmitting device of claim 28, wherein each first transfer sends an entire frame of data to the data receiving device and wherein a frame of data identified in the second table is split, and sent to the data receiving device via a plurality of second transfers.

30. The data transmitting device of claim 28, wherein the first table identifies the frames to be transmitted via first transfers by head address and frame size, and the second table identifies the frames to be transmitted via second transfers by head address and frame size.

31. The data transmitting device of claim 28, wherein the first transfers are isochronous transfers conducted in accordance with Universal Serial Bus (USB) standards, and the second transfers are bulk transfers conducted in accordance with the USB standards.

32. The data transmitting device of claim 31, wherein the buffer section additionally sends an interrupt transfer in accordance with the USB standards after each isochronous transfer, the interrupt transfer requesting acknowledgement of receipt by the data receiving device.

* * * * *